United States Patent
Sano et al.

(10) Patent No.: US 8,675,135 B2
(45) Date of Patent: Mar. 18, 2014

(54) DISPLAY APPARATUS AND DISPLAY CONTROL METHOD

(71) Applicant: Canon Kabushiki Kaisha, Tokyo (JP)

(72) Inventors: Akira Sano, Tokyo (JP); Takayuki Nagashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/734,483

(22) Filed: Jan. 4, 2013

(65) Prior Publication Data
US 2013/0215130 A1 Aug. 22, 2013

Related U.S. Application Data (63) Continuation of application No. 12/504,049, filed on Jul. 16, 2009, now Pat. No. 8,411,203.

(30) Foreign Application Priority Data

Jul. 29, 2008 (JP) ................................. 2008-195312

(51) Int. Cl.
*H04N 5/445* (2011.01)
*H04N 9/76* (2006.01)

(52) U.S. Cl.
USPC .......................................... 348/600; 348/564

(58) Field of Classification Search
USPC ........................................................ 348/564
See application file for complete search history.

(56) References Cited

U.S. PATENT DOCUMENTS

2006/0290817 A1* 12/2006 Yui et al. ........................ 348/564

FOREIGN PATENT DOCUMENTS

WO 2006-059661 A 6/2006

OTHER PUBLICATIONS

The above reference was cited in a Jan. 8, 2013 Japanese Office Action, a copy of which is enclosed without English Translation, that issued in Japanese Patent Application No. 2008-195312.

* cited by examiner

*Primary Examiner* — Jefferey Harold
*Assistant Examiner* — Michael Teitelbaum
(74) *Attorney, Agent, or Firm* — Cowan, Liebowitz & Latman, P.C.

(57) ABSTRACT

A rendering control unit determines movie and graphic display modes with reference to a rendering processing command, and acquires maximum speed information indicating the maximum value of a read/write speed allowed for a memory. The rendering control unit decides a speed to be distributed to a read/write speed of the movie data and a speed to be distributed to a read/write speed of the graphic data with respect to the memory, of a maximum speed indicated by the maximum speed information, based on the determination result. The rendering control unit controls a read/write access of an image with respect to the memory based on the rendering processing command, in accordance with the decided speeds.

10 Claims, 11 Drawing Sheets

FIG. 2

```
<svg>
<circle cx="0" cy="0" r="500" fill="red" fill-opacity="0.3"/>
<video xlink:href="video1" volume=".8" type="video/mpeg" width="1280" height="768" x="156" y="320" repeatCount="indefinite"/>
<circle cx="1920" cy="1080" r="500" fill="blue" fill-opacity="0.3"/>
<rect x="0" y="0" width="1920" height="1080" fill="none" stroke="black" stroke-width="1"/>
</svg>
```

201

202 — `<circle cx="0" cy="0" r="500" fill="red" fill-opacity="0.3"/>`
203 — `<video xlink:href="video1" volume=".8" type="video/mpeg" width="1280" height="768" x="156" y="320" repeatCount="indefinite"/>`
204 — `<circle cx="1920" cy="1080" r="500" fill="blue" fill-opacity="0.3"/>`
205 — `<rect x="0" y="0" width="1920" height="1080" fill="none" stroke="black" stroke-width="1"/>`

DISPLAY APPARATUS AND DISPLAY CONTROL METHOD

CROSS-REFERENCE TO RELATED APPLICATION

This application is continuation of application Ser. No. 12/504,049, filed Jul. 16, 2009, the entire disclosures of which is hereby incorporated by reference.

BACKGROUND OF THE INVENTION

1. Field of the Invention

The present invention relates to a display technique which can composite and display movie and graphic data.

2. Description of the Related Art

Nowadays, the broadcasting scene is making a shift from analog broadcasting to digital broadcasting to provide multi-channel broadcasts and high-definition contents. Display apparatuses which display such broadcast contents increasingly have larger screens and higher definitions.

Also, receivers are changing from those which merely display broadcast video images one-sidedly to those which include a mechanism that allows users to enjoy interactive services by data broadcasting and the like. As a result, the receivers are required to composite graphics data as in general personal computers.

As described above, along with the advent of digital broadcasting, and large-screen, high-definition display apparatuses, a display mode called "multi-window display" that simultaneously displays various media on a single display apparatus is expected. That is, a receiver is required to have a capability of smoothly compositing and displaying a plurality of movie data and graphics data.

However, in order to smoothly composite high-definition movie data and graphics data, high-speed memory transfer is required, resulting in an expensive system.

A technique for controlling a memory bandwidth used in a movie to reduce the cost of a system is disclosed in patent reference 1 (Japanese Patent Laid-Open No. 2003-298938). Patent reference 1 discloses a technique for decimating frames of streams with lower priority levels in accordance with the priority levels of streams upon displaying OSD (graphics) data during display of a plurality of streams.

Patent reference 2 (Japanese Patent Laid-Open No. 2007-057586) discloses the following technique. That is, when graphics and movie data are displayed on a display apparatus which can output images at a high resolution, graphics data whose resolution difference is easily recognizable for users are displayed at a high resolution, and movie data whose resolution difference is not easy to recognize even at a low resolution is rendered at a low resolution and is displayed in an enlarged scale.

The aforementioned related arts achieve a cost reduction of a system by suppressing the bandwidths used in movie data upon displaying graphics data.

However, movie data is displayed to have higher display quality than that of graphics data in some cases (for example, a case in which movies of a plurality of channels are concurrently recorded, a case in which graphics data of a channel indication, tone volume change indication, and the like have a smaller occupation ratio than movie data on the screen, and so forth). In such cases, the qualities of movie and graphics data have to be adaptively controlled, but the aforementioned related arts cannot solve these problems.

For example, the techniques disclosed in patent references 1 and 2 execute movie rendering control to reduce the memory bandwidth to be used, but they cannot execute graphics rendering control.

Also, these techniques cannot adaptively control a band used to render movie data and that used to render graphics data as the situation demands.

SUMMARY OF THE INVENTION

The present invention has been made in consideration of the aforementioned problems, and provides a technique for adaptively controlling a bandwidth required for graphics rendering and that required for movie rendering, in accordance with rendering commands.

According to the first aspect of the present invention, a display apparatus, which comprises a memory having a memory area used to render movie data and a memory area used to render graphic data to be composited on the movie data, and reads out and displays an image written in the memory, comprises:

a unit which acquires rendering command information which describes a rendering command of at least one of the movie data and the graphic data;

a determination unit which determines display modes of the movie data and graphic data with reference to the rendering command information;

a unit which acquires maximum speed information indicating a maximum value of a read/write speed allowed for the memory;

a decision unit which decides a first speed to be distributed to a read/write speed of the movie data with respect to the memory and a second speed to be distributed to a read/write speed of the graphic data with respect to the memory, of a maximum speed indicated by the maximum speed information, based on the determination result of the determination unit; and a control unit which controls a read/write access of an image with respect to the memory based on the rendering command information, in accordance with the speeds decided by the decision unit.

According to the second aspect of the present invention, a display apparatus, which comprises a memory having a memory area used to render movie data and a memory area used to render graphic data to be composited on the movie data, and reads out and displays an image written in the memory, comprises:

a unit which acquires rendering command information which describes a rendering command of at least one of the movie data and the graphic data;

a calculation unit which calculates a read/write speed of the movie data with respect to the memory and a read/write speed of the graphic data with respect to the memory;

a unit which acquires maximum speed information indicating a maximum value of a read/write speed allowed for the memory;

a decision unit which decides a first speed to be distributed to a read/write speed of the movie data with respect to the memory and a second speed to be distributed to a read/write speed of the graphic data with respect to the memory, of a maximum speed indicated by the maximum speed information, based on the respective read/write speeds calculated by the calculation unit; and a control unit which controls a read/write access of an image with respect to the memory based on the rendering command information, in accordance with the speeds decided by the decision unit.

According to the third aspect of the present invention, a display control method for a display apparatus, which comprises a memory having a memory area used to render movie data and a memory area used to render graphic data to be composited on the movie data, and reads out and displays an image written in the memory, uses the display apparatus to perform the steps of:

a step of acquiring rendering command information which describes a rendering command of at least one of the movie data and the graphic data;

a determination step of determining display modes of the movie data and graphic data with reference to the rendering command information;

a step of acquiring maximum speed information indicating a maximum value of a read/write speed allowed for the memory;

a decision step of deciding a first speed to be distributed to a read/write speed of the movie data with respect to the memory and a second speed to be distributed to a read/write speed of the graphic data with respect to the memory, of a maximum speed indicated by the maximum speed information, based on the determination result in the determination step; and a control step of controlling a read/write access of an image with respect to the memory based on the rendering command information, in accordance with the speeds decided in the decision step.

According to the fourth aspect of the present invention, a display control method for a display apparatus, which comprises a memory having a memory area used to render movie data and a memory area used to render graphic data to be composited on the movie data, and reads out and displays an image written in the memory, uses the display apparatus to perform the steps of:

a step of acquiring rendering command information which describes a rendering command of at least one of the movie data and the graphic data;

a calculation step of calculating a read/write speed of the movie data with respect to the memory and a read/write speed of the graphic data with respect to the memory;

a step of acquiring maximum speed information indicating a maximum value of a read/write speed allowed for the memory;

a decision step of deciding a first speed to be distributed to a read/write speed of the movie data with respect to the memory and a second speed to be distributed to a read/write speed of the graphic data with respect to the memory, of a maximum speed indicated by the maximum speed information, based on the respective read/write speeds calculated in the calculation step; and a control step of controlling a read/write access of an image with respect to the memory based on the rendering command information, in accordance with the speeds decided in the decision step.

Further features of the present invention will become apparent from the following description of exemplary embodiments with reference to the attached drawings.

DESCRIPTION OF THE EMBODIMENTS

Embodiments of the present invention will be described in detail hereinafter with reference to the accompanying drawings. Note that these embodiments will be explained as examples of the arrangements of the invention described in the scope of claims, and that invention is not limited to the embodiments to be described hereinafter.

[First Embodiment]

Figure 1:
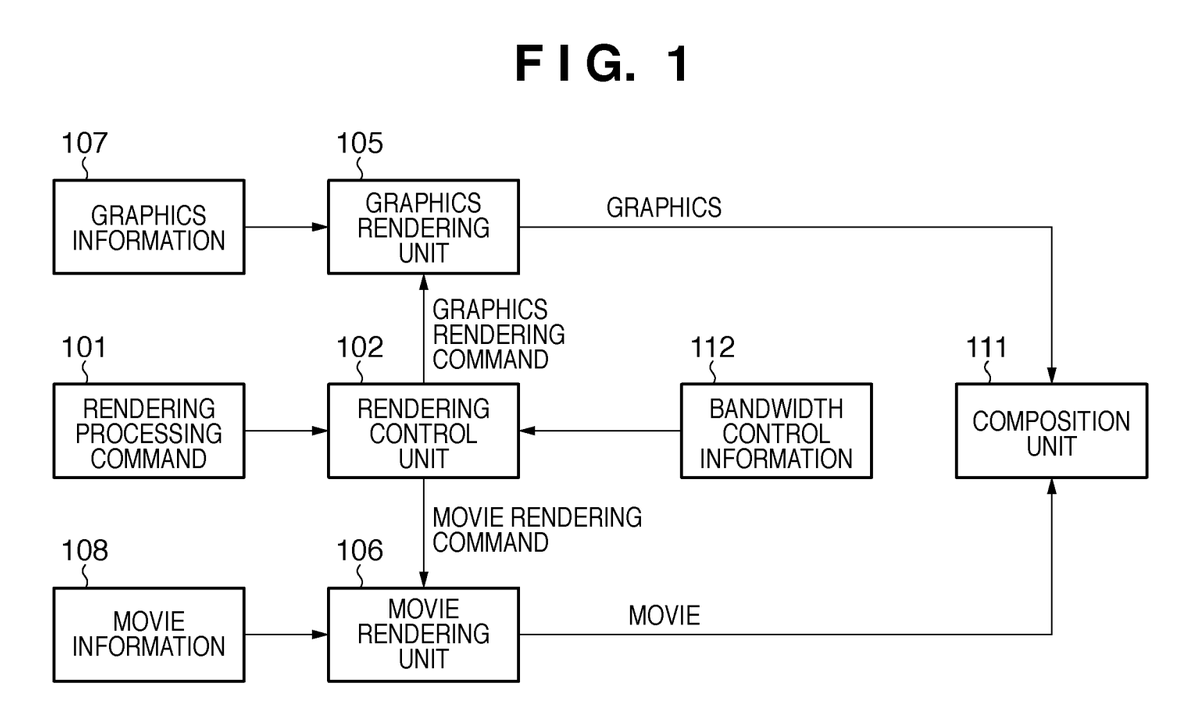
FIG. 1 is a block diagram showing an example of the functional arrangement of a display apparatus according to the first embodiment of the present invention.

FIG. 1 is a block diagram showing an example of the functional arrangement of a display apparatus according to this embodiment. The display apparatus according to this embodiment includes a graphics rendering unit 105, movie rendering unit 106, rendering control unit 102, and composition unit 111.

The graphics rendering unit 105 receives graphics information 107 as graphics data. The graphics information 107 includes, for example, data of a tone volume indication object, channel indication object, and the like. These objects are to be composited on movie data to be described later. The graphics rendering unit 105 renders graphics data using this graphics information 107 under the control of the rendering control unit 102. This rendering processing is executed on a memory (not shown) included in the display apparatus.

The movie rendering unit 106 receives movie information 108 as movie data. The movie information 108 includes, for example, image data, number information, and the like of respective frames which form a movie. The movie rendering unit 106 renders images of respective frames using this movie information 108 under the control of the rendering control unit 102. This rendering processing is executed on a memory (not shown) included in the display apparatus. Note that the memory used in rendering by the graphics rendering unit 105 may be different from that used in rendering by the movie rendering unit 106, or a single memory may be shared by the graphics rendering unit 105 and movie rendering unit 106.

That is, the memory included in the display apparatus according to this embodiment is a "memory having a memory area used to render movie data, and a memory area used to render graphics data to be composited on the movie data". Such memory may include a single memory, or memories corresponding to these memory areas.

The rendering control unit 102 receives a rendering processing command 101 (rendering command information), and bandwidth control information 112.

The rendering processing command 101 is rendering command information that describes a rendering command of at least one of movie and graphics data. In this embodiment, since both the movie and graphics data are to be rendered, the rendering processing command 101 describes rendering commands of both the movie and graphics data in this case.

The bandwidth control information 112 is table information which holds information that prescribes read and write speeds (bandwidths) of the movie and graphics data with respect to the memory in correspondence with each of combinations of movie display modes and graphics display modes.

The rendering control unit 102 corrects this rendering processing command 101 as needed by executing processing to be described later using the rendering processing command 101 and bandwidth control information 112. The rendering control unit 102 outputs a graphics rendering command of the rendering processing command 101 to the graphics rendering unit 105, thereby controlling the graphics rendering processing of the graphics rendering unit 105. Also, the rendering control unit 102 outputs a movie rendering command of the rendering processing command 101 to the movie rendering unit 106, thereby controlling the movie rendering processing of the movie rendering unit 106.

The composition unit 111 generates a composite frame image by compositing the graphics data rendered on the memory by the graphics rendering unit 105 onto the movie data rendered on the memory by the movie rendering unit 106, and outputs the generated composite frame image. The output destination is a display unit such as a CRT or liquid crystal display panel. Of course, the composite frame image may be output to an external apparatus via a network, and the output destination is not particularly limited.

The processing sequences based on the flowcharts to be described below are not limited to these examples, and every combinations of sequences, a combination of a plurality of processes, and segmentation of processes are allowed as long as the following result is satisfied. Each individual process may be extracted to function as a single functional element, and may be combined with processes other than those to be described below.

Figure 6:
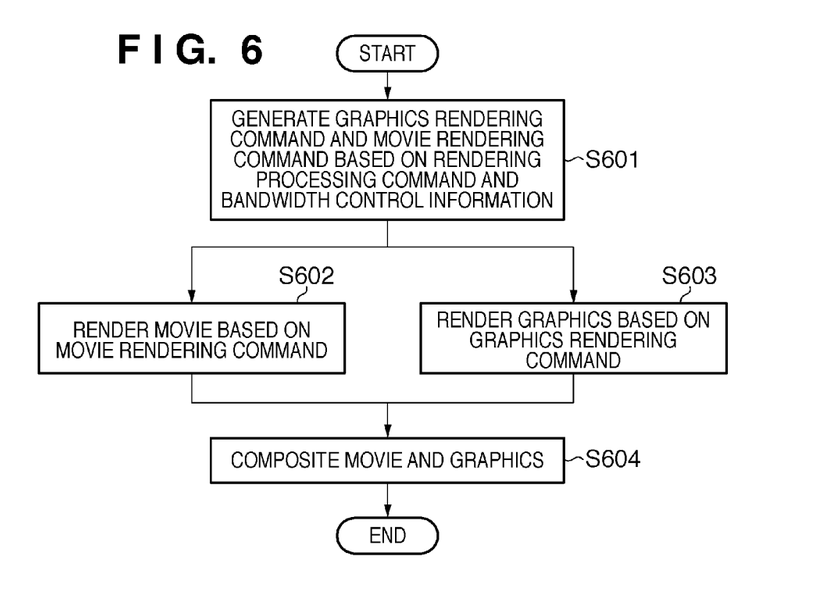
FIG. 6 is a flowchart of processing (display control method) executed when the display apparatus according to the first embodiment of the present invention composites and displays movie and graphics data.

FIG. 6 is a flowchart showing processing (display control method) executed when the display apparatus according to this embodiment composites and displays movie and graphics data.

In step S601, the rendering control unit 102 acquires the rendering processing command 101 and bandwidth control information 112. The rendering control unit 102 generates a graphics rendering command to be supplied to the graphics rendering unit 105 and a movie rendering command to be supplied to the movie rendering unit 106 using these pieces of acquired information. The rendering control unit 102 outputs the generated graphics rendering command to the graphics rendering unit 105, and the generated movie rendering command to the movie rendering unit 106.

In step S602, the movie rendering unit 106 renders movie data (each frame image) based on the movie information 108 on the memory in accordance with the movie rendering command supplied from the rendering control unit 102. Since the movie information 108 includes, for example, an Mpeg2-TS as the format of Mpeg2 system broadcasting or an Mpeg2-PS as the format of stored contents, the movie rendering unit 106 decodes the movie information 108 and then renders the movie data in this step.

On the other hand, in step S603 the graphics rendering unit 105 renders graphics data based on the graphics information 107 on the memory in accordance with the graphics rendering command supplied from the rendering control unit 102. The graphics information 107 includes resources used in the graphics rendering processing such as still image data in the Bitmap or Jpeg format or outline font data, and layout information used to control the layouts and sizes of the resources.

Note that steps S602 and S603 are executed concurrently.

In step S604, the composition unit 111 generates a composite frame image by compositing the graphics data rendered on the memory by the graphics rendering unit 105 onto the movie data rendered on the memory by the movie rendering unit 106. Then, the composition unit 111 outputs the generated composite frame image. The output destination is as described above.

The processes in the aforementioned steps will be described in more detail below.

Figure 2:
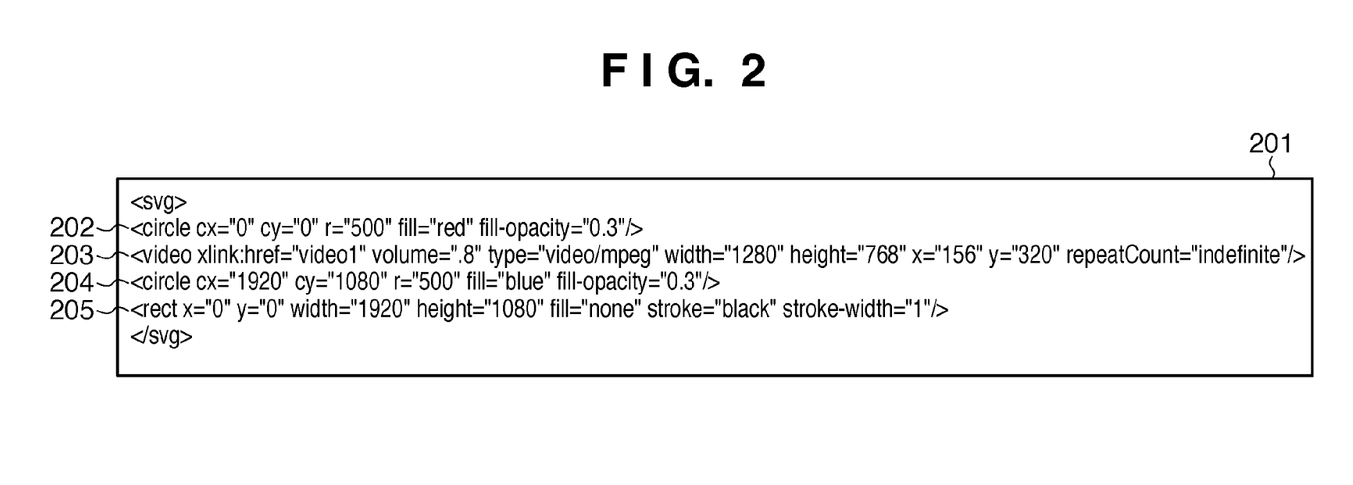
FIG. 2 is a view showing an example of the configuration of a rendering processing command 101.

The rendering processing command 101 will be described first. FIG. 2 is a view showing an example of the configuration of the rendering processing command 101.

Referring to FIG. 2, reference numeral 201 denotes the rendering processing command 101 described using SVG. The SVG represents a vector graphic language described using XML or an image format described using the SVG, and is recommended as an open standard by W3C (World Wide Web Consortium).

Reference numeral 202 denotes a rendering command required to render a circular graphics object. More specifically, the rendering command 202 is required to render a circle having coordinates (0, 0) as the center and a radius=500 by filling it with red having a transparency=0.3.

Reference numeral 204 denotes a rendering command required to render a circular graphics object. More specifically, the rendering command 204 is required to render a circle having coordinates (1920, 1080) as the center and a radius=500 by filling it with blue having a transparency=0.3.

Reference numeral 205 denotes a rendering command required to render a rectangular graphics object. More specifically, the rendering command 205 is required to render a rectangle having coordinates (0, 0) as one corner, a width=1920, and a height=1080, using a black line having a line width of one pixel.

Reference numeral 203 denotes a rendering command required to render a movie. More specifically, the rendering command 203 is required to render video1 of the mpeg format within a region having coordinates (156, 320) as one corner, a width=1280, and a height=768, and to set a tone volume=0.8.

Note that the coordinate values described in the aforementioned rendering commands are those on the screen used to display the graphics and movie data.

Figure 3:
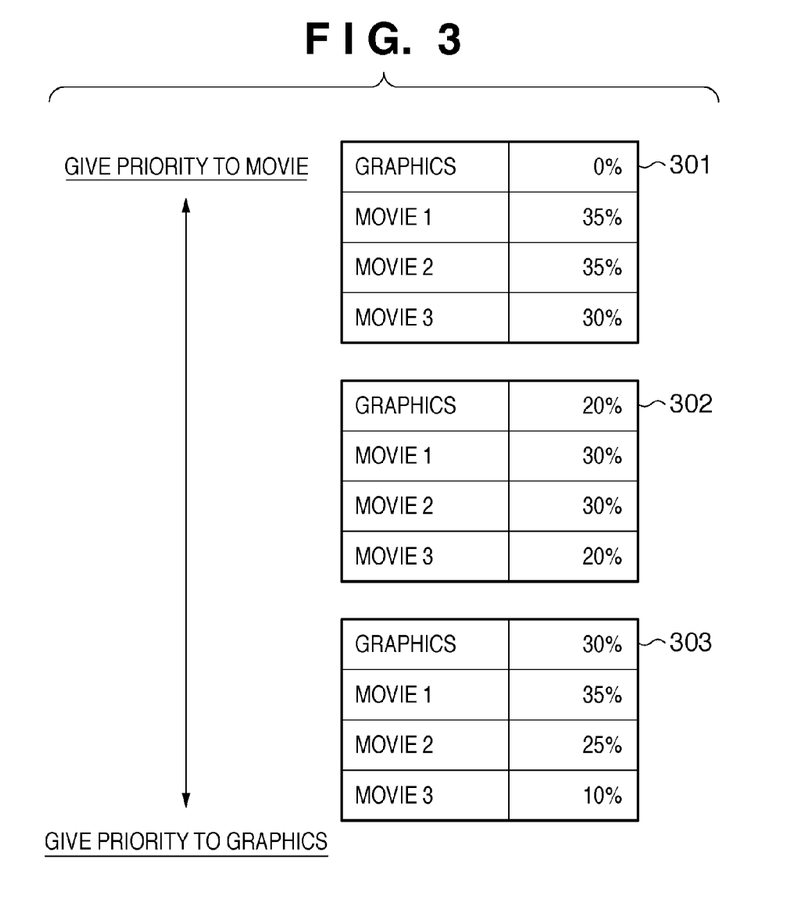
FIG. 3 is a view showing an example of the configuration of bandwidth control information 112.

The bandwidth control information 112 will be described below. FIG. 3 is a view showing an example of the configuration of the bandwidth control information 112. Note that FIG. 3 shows the bandwidth control information 112 including three pieces of table information 301 to 303.

Referring to FIG. 3, reference numeral 301 denotes table information used when top priority is given to movie data. When no graphics data is required to be displayed in the screen (for example, when the user is watching a TV broadcast program or that TV broadcast program is being recorded), no read/write access of the graphics data is made on the memory, as a matter of course. Therefore, in such case, the maximum value of the read/write speed allowed for the memory (a maximum read/write speed that the display apparatus can assume upon making read/write accesses to the memory) can be assigned to that of movie data with respect to the memory. The table information 301 is used in such case, and since no graphics read/write access is made with respect to the memory, 0% is assigned as a ratio distributed to the graphics read/write speed with respect to the memory. As a ratio distributed to the read/write speed of movie data with respect to the memory, 100% as the remainder of the maximum value are assigned. In case of FIG. 3, since three movies (movie 1, movie 2, and movie 3) are to be displayed as the movie data, 100% are further distributed to the respective movie data.

Reference numeral 302 denotes table information which gives higher priority to graphics data than the table information 301. For example, both the graphics and movie data are to be displayed within one screen but the movie can be displayed in a reduced scale, for example, when data broadcast contents are displayed. In such case, a ratio distributed to the graphics read/write speed with respect to the memory of the maximum value has to be higher than the table information 301. The table information 302 is used in such case, and 20% are assigned as a ratio to be distributed to the graphics read/write speed with respect to the memory of the maximum value. As a ratio distributed to the movie read/write speed of movie data with respect to the memory, 80% as the remainder of the maximum value are assigned. In case of FIG. 3, since three movies (movie 1, movie 2, and movie 3) are to be displayed as the movie data, 80% are further distributed to the respective movie data.

Reference numeral 303 denotes table information which gives higher priority to graphics data than the table information 302. For example, translucent graphics data are superimposed on movie data, for example, when an EPG (Electronic Program Guide) is to be displayed (when translucent graphics data cover full or a part of movie data). In such case, the ratio distributed to the graphics read/write speed with respect to the memory has to be higher than the table information 302. The table information 303 is used in such case, and 30% are assigned as a ratio to be distributed to the graphics read/write speed with respect to the memory of the maximum value. As a ratio distributed to the movie read/write speed of movie data with respect to the memory, 70% as the remainder of the maximum value are assigned. In case of FIG. 3, since three movies (movie 1, movie 2, and movie 3) are to be displayed as the movie data, 70% are further distributed to the respective movie data.

As described above, pieces of table information are generated in advance in correspondence with combinations of movie display modes and graphics display modes. Then, the table information group generated in this way is input to the rendering control unit 102 as the bandwidth control information 112. Note that FIG. 3 has explained the three pieces of table information for the sake of descriptive convenience. However, since various other cases are assumed, various configurations of table information are available, and the number of pieces of table information is not particularly limited. Also, graphics and movie data are often displayed at the same time like a menu screen or an OSD display. Table information may also be generated for such case, or another table information may be commonly used.

Figure 4:
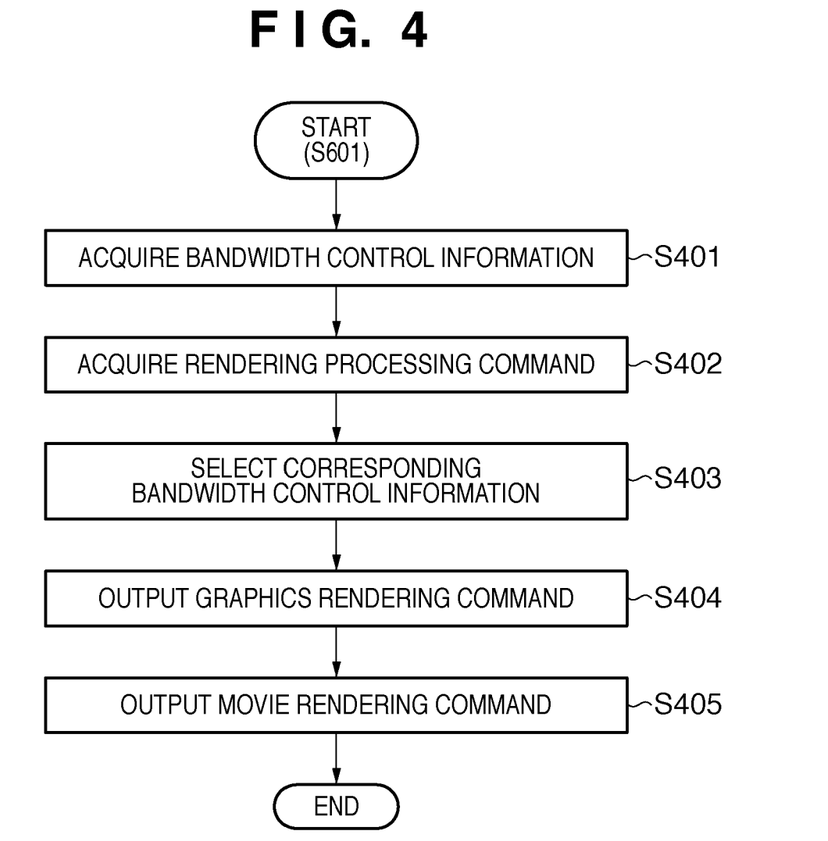
FIG. 4 is a flowchart showing details of processing to be executed by a rendering control unit 102 in step S601.

The processing to be executed by the rendering control unit 102 in step S601 above will be described below with reference to the flowchart of FIG. 4 which shows details of that processing.

In step S401, the rendering control unit 102 acquires the bandwidth control information 112. The bandwidth control information 112 may be acquired for each rendering processing by the graphics rendering unit 105 and movie rendering unit 106 or it may be acquired only once upon starting up the display apparatus according to this embodiment, and the acquired bandwidth control information 112 may be referred to in the subsequent processes.

In step S402, the rendering control unit 102 acquires the rendering processing command 101. Then, the rendering control unit 102 specifies a movie display mode and graphics display mode with reference to the acquired rendering processing command 101.

In step S403, the rendering control unit 102 acquires table information corresponding to the combination of the movie display mode and graphics display mode specified in step S402 from the respective pieces of table information in the bandwidth control information 112 acquired in step S401.

In step S404, the rendering control unit 102 extracts a graphic rendering command from the rendering processing command 101 acquired in step S402, and corrects the extracted rendering command as needed based on the table information acquired in step S403. This processing will be described in detail later. However, the correction is made as needed but is not always required. The rendering control unit 102 outputs the extracted rendering command or corrected rendering command) to the graphics rendering unit 105.

In step S405, the rendering control unit 102 extracts a movie rendering command from the rendering processing command 101 acquired in step S402, and corrects the extracted rendering command as needed based on the table information acquired in step S403. This processing will be described in detail later. However, the correction is made as needed but is not always required. The rendering control unit 102 outputs the extracted rendering command (or corrected rendering command) to the movie rendering unit 106.

The processes in step S404 and subsequent step will be described in more detail below.

The read/write speed with respect to the memory satisfies:

Read/write speed with respect to memory>Σ(write speed to memory)+Σ(read speed from memory)

Assume that the following parameters (setting information that prescribes images to be input and output) are respectively set in the display apparatus in correspondence with the movie and graphics data.
(1) HD video input (YcbCr444) . . . 24 bits, 1080i, 30 fps
(2) HD video output (YcbCr444) . . . 24 bits, 1080i, 30 fps
(3) Graphics rendering (RGBA) . . . 32 bits, 60 fps The parameters in item (1) are required when a Hi-Vision video is written in the memory. The parameters in item (2) are required when a Hi-Vision video is read out from the memory. The parameters in item (3) are required upon rendering graphics data on the memory.

When these parameters are set, a minimum speed as the movie read/write speed with respect to the memory is calculated based on:

24÷8×1920×1080×30×2=360 MB/s

That is, the total value of the product of the number of bits, image size, and frame rate of input movie data and that of the number of bits, image size, and frame rate of output movie data is calculated as a minimum speed (first speed information) as the movie read/write speed with respect to the memory.

Likewise, when the aforementioned parameters are set, a minimum speed as the graphics rendering speed with respect to the memory is calculated based on:

$$32 \div 8 \times 1920 \times 1080 \times 60 = 480 \text{ MB/s}$$

(assume that this equation is premised on that graphics data is rendered to have a size of 1920×1080)

That is, the product of the number of bits, graphics size, and frame rate of graphics data is calculated as a minimum speed (second speed information) as the graphics rendering speed with respect to the memory.

If three movie data and one graphics data are to be output at the same time, a minimum speed required as the access speed with respect to the memory is calculated based on:

$$180 \times 2 \times 3 + 480 = 1.56 \text{ GB/s}$$

Of course, upon execution of image quality enhancement processing such as noise removal and enhancer processing, a broader bandwidth is required.

If the speed (the maximum speed, maximum value, or maximum speed information), which can be assigned as the access speed with respect to the memory is 1.2 GB/s, it does not reach 1.56 GB/s mentioned above, and the processing delays.

An execution memory bandwidth the maximum value) can be calculated by:

> Execution memory bandwidth=transfer amount of memory ×memory transfer efficiency×usable ratio for movie+transfer amount of memory× memory transfer efficiency ×usable ratio for graphics The memory transfer efficiency is a ratio of a data transfer bandwidth that can be actually used with respect to a theoretical maximum transfer bandwidth. The memory transfer efficiency changes depending on the functions of a memory controller and the frequency of an access pattern to the memory such as random access or sequential access. For this reason, the memory transfer efficiency can be calculated in advance by measuring the memory transfer speed in a memory access pattern in the movie rendering processing and graphics rendering processing.

The processes in steps S404 and S405 will be described in more detail below. In the above description, the processes in steps S404 and S405 have been described as independent processes. However, in the following description, the processes in steps S404 and S405 will be explained as those to be executed in a single step.

Figure 5:
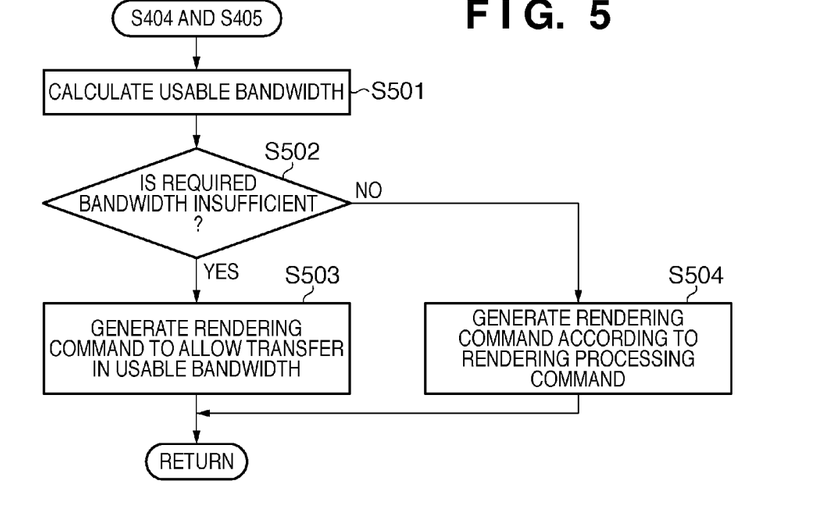
FIG. 5 is a flowchart showing details of processing in steps S404 and S405.

FIG. 5 is a flowchart showing details of the processes in steps S404 and S405.

In step S501, the rendering control unit 102 executes the above arithmetic processing to calculate a minimum speed required as the movie read/write speed with respect to the memory, and a minimum speed required as the graphics read/write speed with respect to the memory. In the following description, assume that 360 MB/s are calculated as the minimum speed required as the movie read/write speed with respect to the memory, and 480 MB/s are calculated as the minimum speed required as the graphics read/write speed with respect to the memory. Also, in the following description, assume that the speed that can be assigned as the access speed with respect to the memory is 1.2 GB/s.

In this case, when three HD movie data are displayed, and no graphics data is displayed, the table information 301 is selected in step S403 described above. In this case, from the speed=1.2 GB/s that can be assigned as the access speed with respect to the memory, the speeds that can be assigned to graphics data and data of movies 1 to 3 can be calculated using that table information as:

Graphics 1.2 GB/s×0%=0 MB/s
Movie 1 1.2 GB/s×35%=420 MB/s
Movie 2 1.2 GB/s×35%=420 MB/s
Movie 3 1.2 GB/s×30%=360 MB/s However, as described above, since the minimum speed required as the movie read/write speed with respect to the memory is 360 MB/s, and the minimum speed required as the graphics read/write speed with respect to the memory is 480 MB/s, a speed higher than these speeds is not required. Therefore, the respective read/write speeds are set as follows:

Graphics 0 MB/s
Movie 1 360 MB/s
Movie 2 360 MB/s
Movie 3 360 MB/s

In this case, since 360 MB/s×3=1.08 GB/s<1.2 GB/s, the minimum speed=360 MB/s can be assigned to data of movies 1 to 3. Of course, a maximum read/write speed that can be assigned may be assigned to the data of movies 1 to 3.

On the other hand, upon displaying data broadcasting, the table information 302 is selected in step S403. In this case, from the speed=1.2 GB/s that can be assigned as the access speed with respect to the memory, the speeds that can be assigned to graphics data and data of movies 1 to 3 (first speed, second speed) can be calculated using that table information as:

Graphics 1.2 GB/s×20%=240 MB/s
Movie 1 1.2 GB/s×30%=360 MB/s
Movie 2 1.2 GB/s×30%=360 MB/s
Movie 3 1.2 GB/s×20%=240 MB/s However, as described above, the minimum speed required as the movie read/write speed with respect to the memory is 360 MB/s, and the minimum speed required as the graphics read/write speed with respect to the memory is 480 MB/s. Hence, in this case, the graphics read/write speed is lower by 240 MB/s than the minimum speed, and the read/write speed for movie 3 is lower by 120 MB/s from the minimum speed. In this embodiment, in such case, the rendering commands for graphics data and movie 3 data are corrected so as not to cause any processing delays even when the memory read/write accesses are made at speeds assigned to them.

In step S502, the rendering control unit 102 executes the following processing. That is, the rendering control unit 102 determines whether or not the speeds, which are distributed to movie and graphics data based on the table information acquired in step S403, are equal to or higher than the minimum speeds calculated for graphics and movie data in step S501. As a result of determination, if conditions that the speeds distributed to the movie data are equal to higher than the minimum speed calculated for movie data, and the speed distributed to the graphics data is equal to or higher than the minimum speed calculated for graphics data are satisfied, the process advances to step S504. On the other hand, if the conditions are not satisfied, the process advances to step S503.

In step S503, the rendering control unit 102 corrects the rendering commands so that processing can be executed within the assigned speeds without causing any processing delays. Such correction can be attained by reducing the resolution and frame rate of graphics and movie data to reduce the memory transfer amount per unit time.

For example, in the aforementioned example, since the graphics read/write speed is lower by 240 MB/s than the minimum speed, the read/write data amount with respect to the memory is reduced so as not to cause any graphics read/write delay (transfer delay) with respect to the memory.

For example, when the resolution of graphics data to be read or written with respect to the memory is reduced, if this reduction ratio is given by α, we have:

$$32 \div 8 \times 1920\alpha \times 1080\alpha \times 60 = 240 \text{ MB/s}$$

From this equation, since α≈0.7, graphics data is written in the memory after original data is scaled to ×0.7. Therefore, in such case, correction processing for adding a command that executes ×0.7 scaling to the graphics rendering command in the rendering processing command 101 is executed.

In addition to the resolution change, the same object can be achieved by changing the frame rate of graphics data from 60 fps to 30 fps.

As for movie 3, since the read/write speed is lower by 120 MB/s than the minimum speed, the read/write data amount with respect to the memory has to be reduced to ⅔ so as not to cause any read/write delay (transfer delay) of movie data with respect to the memory.

For example, when the resolution (output resolution) of movie data read out from the memory is to be changed, the graphics read speed from the memory is calculated first based on:

(Minimum speed for graphics=240 MB/s)−graphics write speed with respect to memory=180)=60 MB/s Then, letting α be the resolution of movie data read out from the memory, we have:

$$24 \div 8 \times 1920\alpha \times 1080\alpha \times 30 \times 2 = 60 \text{ MB/s}$$

From this equation, since α≈0.4, movie data is rendered on the memory after the resolution of original data is down-converted to ×0.4. Therefore, in such case, correction processing for adding a command that executes ×0.4 down-conversion to the rendering command of movie data in the rendering processing command 101 is executed.

In this way, the graphics rendering command and movie rendering command, which are corrected as needed, are output to the graphics rendering unit 105 and movie rendering unit 106.

On the other hand, in step S504 since the rendering processing command 101 does not require any change, the graphics rendering command of that rendering processing command 101 is output to the graphics rendering unit 105, and the movie rendering commands are output to the movie rendering unit 106.

<Modification>

As will be described below, by changing a read/write speed little by little along with an elapse of time, an abrupt quality drop is prevented.

Figure 13:
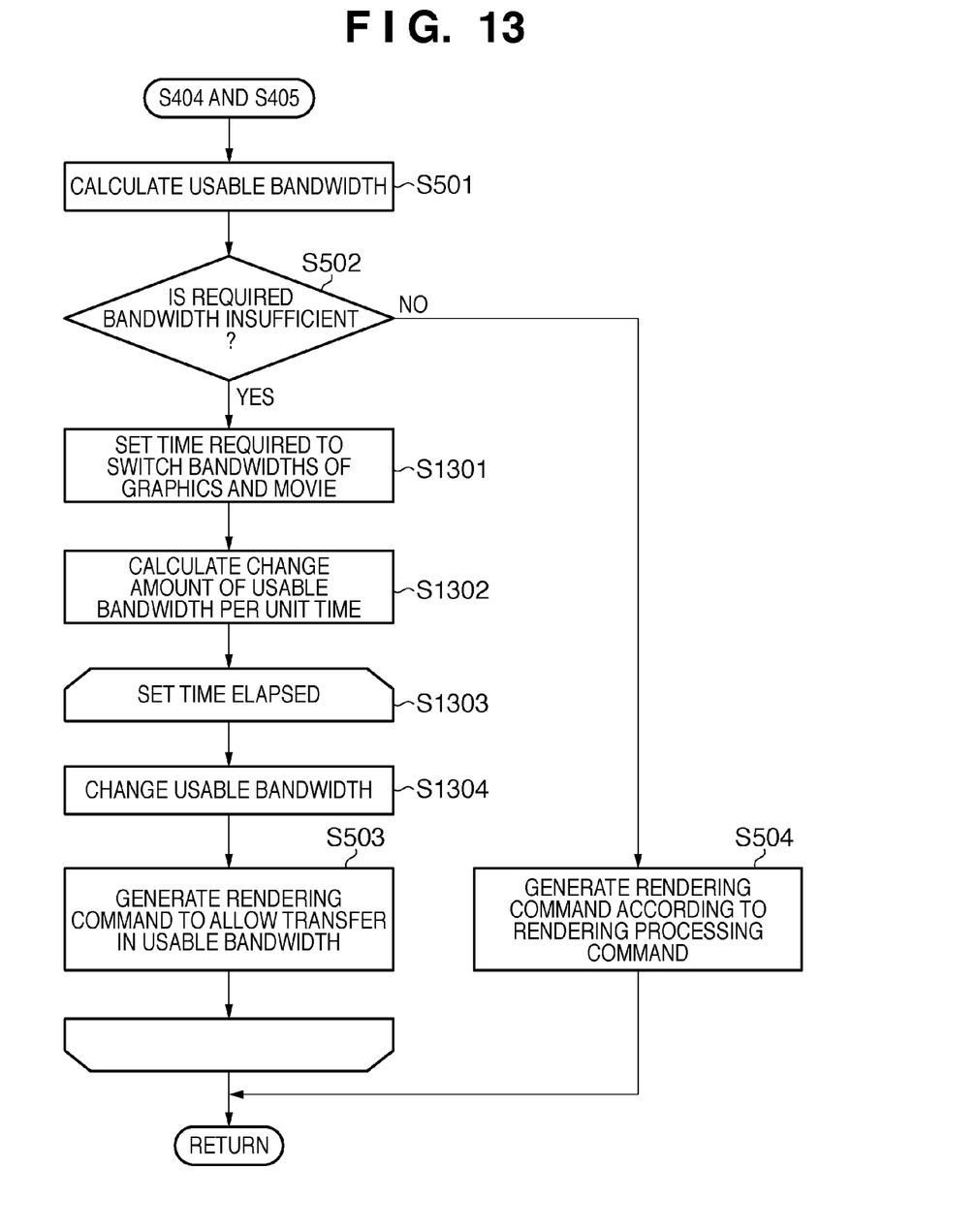
FIG. 13 is a flowchart showing details of processing in steps S404 and S405 according to another aspect.

FIG. 13 is a flowchart showing details of the processes in steps S404 and S405 according to another aspect. Note that the same step numbers in FIG. 13 denote steps that execute the same processes as in FIG. 5, and a repetitive description thereof will be avoided.

In this embodiment, if the above conditions are not satisfied as a result of the determination process in step S502, the process advances to step S1301.

In step S1301, the rendering control unit 102 sets a time required to exchange speeds between the read/write speed assigned to graphics data and that assigned to movie data. This time is defined in advance (e.g., 3 sec).

In step S1302, the rendering control unit 102 decides an amount of speed to be exchanged per unit time. For example, if "3" sec are set in step S1301, and the unit time is "1" sec, and if the table information 301 is switched to the table information 302, the graphics read/write speed is increased in increments of 40 MB/s per sec according to:

(240 MB/s−120 MB/s)÷3=40 MB/s

On the other hand, the read/write speed of movie 3 data is decreased in decrements of 40 MB/s per sec according to:

(360 MB/s−240 MB/s)÷3=40 MB/s

This unit time may be defined in advance using seconds or milliseconds, or may be dynamically calculated from, e.g., the frame rate of movie or graphics data.

In step S1303, the processes in steps S1304 and S503 are repeated in correspondence with the time set in step S1301.

In step S1304, processing for changing, per unit time, the graphics and movie read/write speeds by the amounts calculated in step S1302 is executed.

In step S503, processing for correcting the rendering processing command 101 is executed by executing the same processing as in the first embodiment using the read/write speeds changed in step S1304.

As described above, according to this embodiment, the graphics and movie rendering processes can be adaptively controlled within the limited read/write speeds with respect to the memory.

[Second Embodiment]

In this embodiment, the currently used read/write speeds are monitored, and the graphics and movie rendering processes are controlled in accordance with the monitored read/write speeds without using the bandwidth control information 112. Differences from the first embodiment will be described below.

Figure 7:
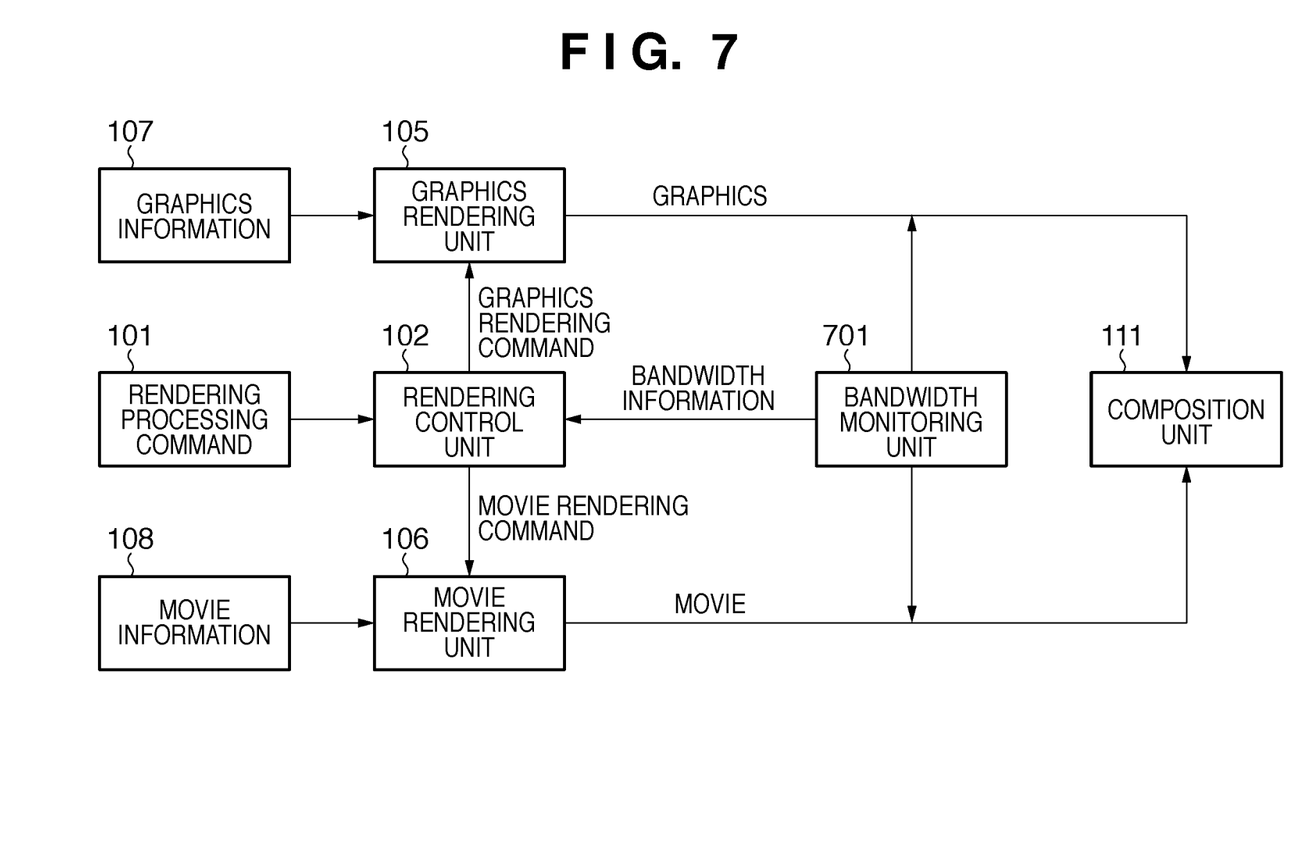
FIG. 7 is a block diagram showing an example of the functional arrangement of a display apparatus according to the second embodiment of the present invention.

FIG. 7 is a block diagram showing an example of the functional arrangement of a display apparatus according to this embodiment. Note that the same reference numerals in FIG. 7 denote the same parts as in FIG. 1, and a repetitive description thereof will be avoided.

A bandwidth monitoring unit 701 monitors a graphics read/write speed and movie read/write speed in real time by monitoring read/write request signals, addresses, and data issued on a memory bus, and notifies the rendering control unit 102 of the monitoring result as bandwidth information.

Figure 8:
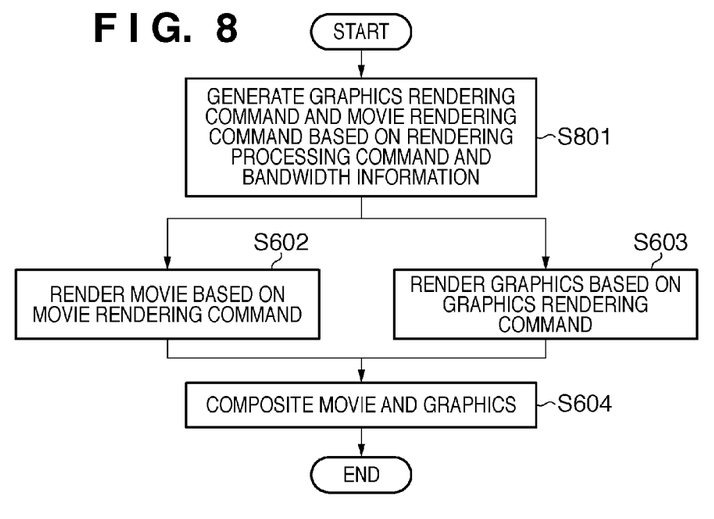
FIG. 8 is a flowchart of processing executed when the display apparatus according to the second embodiment of the present invention composites and displays movie and graphics data.

FIG. 8 is a flowchart of processing executed when the display apparatus according to this embodiment composites and displays movie and graphics data. Note that the same step numbers in FIG. 8 denote the steps that execute the same processes as in FIG. 6, and a repetitive description thereof will be avoided.

In step S801, the rendering control unit 102 acquires the bandwidth information as the monitoring result of the bandwidth monitoring unit 701, and executes the same processing as in the first embodiment using the acquired bandwidth information and the rendering processing command 101.

Figure 9:
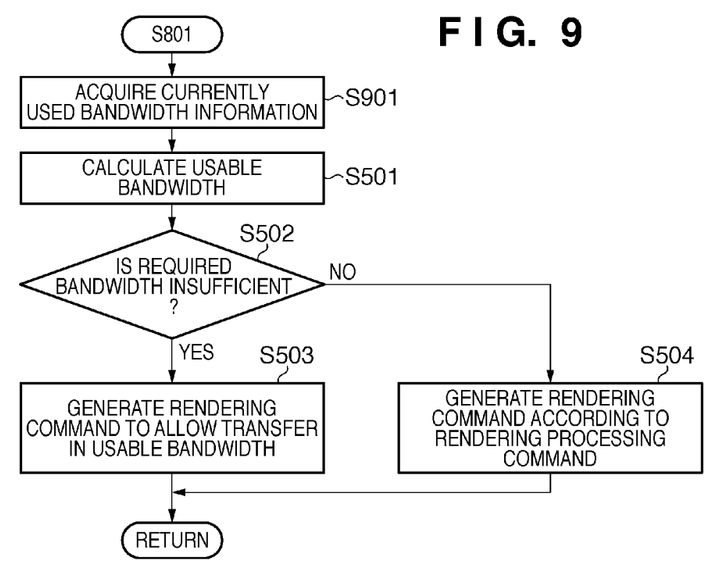
FIG. 9 is a flowchart showing details of processing in step S801.

FIG. 9 is a flowchart showing details of the processing in step S801. Note that the same step numbers in FIG. 9 denote the steps that execute the same processes as in FIG. 5, and a repetitive description thereof will be avoided.

In step S901, the rendering control unit 102 acquires the current graphics read/write speed and current movie read/write speed from the bandwidth monitoring unit 701 as monitoring information. This information indicates the data transfer amount (MB) per sec. For example, assume that memory addresses used by graphics data are "0xA0000000 to 0xA07E9000", and 100000000 write request signals are generated per sec in a 32-bit mode with respect to the addresses within that range. In this case, a read/write speed=400 MB/s can be determined from:

$$32 \div 8 \times 100000000 = 400 \text{ MB/s}$$

The subsequent processes are executed in the same manner as in the first embodiment. That is, whether or not the read/write speeds indicated by the monitoring information calculated in step S901 are lower than the minimum speeds is determined, and processing for correcting the rendering processing command 101 is executed in accordance with the determination result.

[Third Embodiment]

In this embodiment, a graphics read/write speed and movie read/write speed at the next timing are predicted from the current graphics read/write speed and current movie read/write speed without using the bandwidth control information 112. Then, the graphics and movie rendering processes are controlled in accordance with the predicted read/write speeds.

Figure 10:
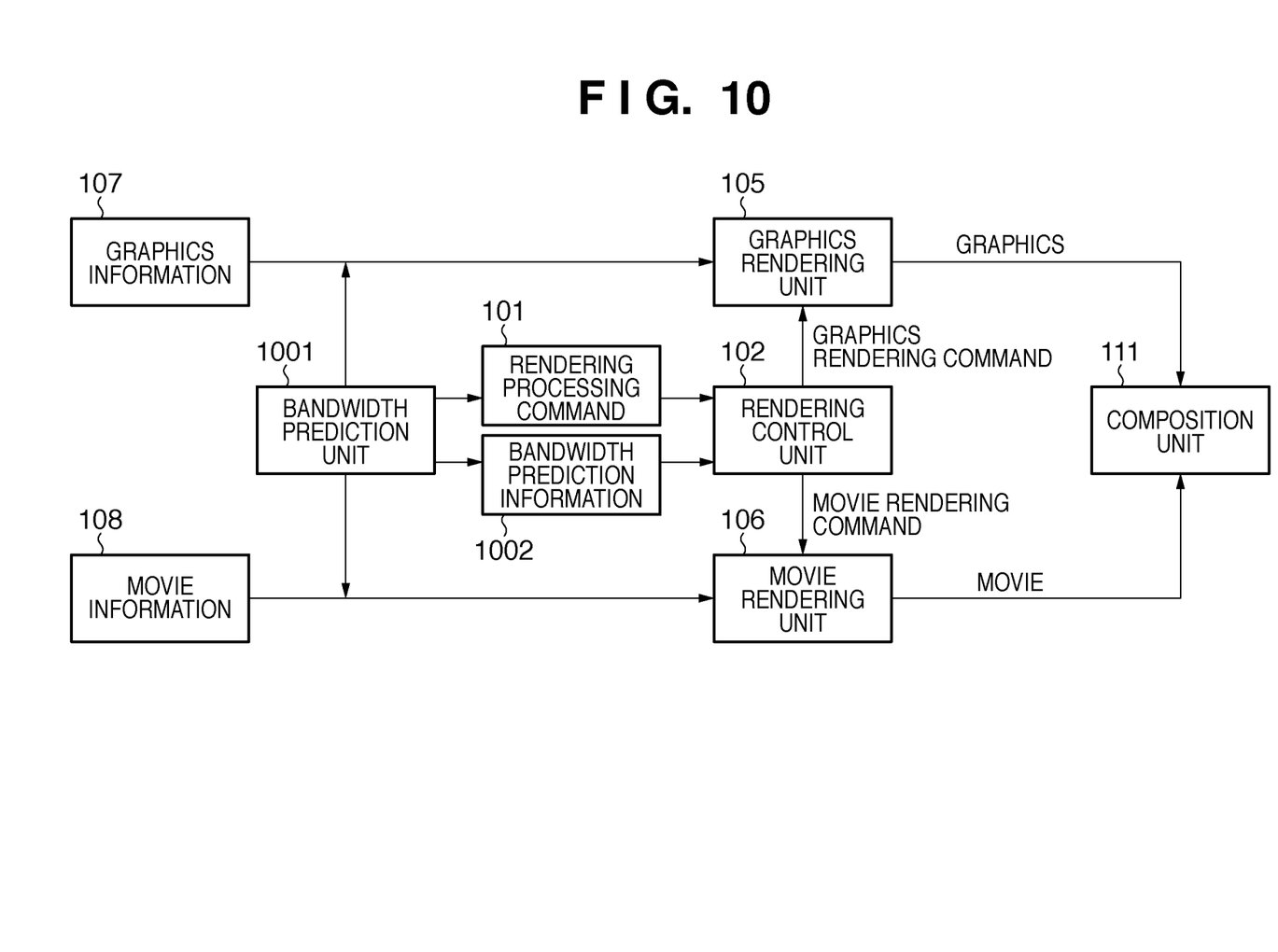
FIG. 10 is a block diagram showing an example of the functional arrangement of a display apparatus according to the third embodiment of the present invention.

FIG. 10 is a block diagram showing an example of the functional arrangement of a display apparatus according to this embodiment. Note that the same reference numerals in FIG. 10 denote the same parts as in FIG. 1, and a repetitive description thereof will be avoided.

A bandwidth prediction unit 1001 predicts graphics and movie read/write speeds based on the resolution, number of colors, and frame rate of graphics data which is currently displayed, and the number of movies which are currently displayed, and notifies the rendering control unit 102 of the prediction result as bandwidth prediction information 1002. The bandwidth prediction unit 1001 also outputs the rendering processing command 101 to the rendering control unit 102.

The rendering control unit 102 executes the same processing as in the first embodiment using the bandwidth prediction information 1002 in place of the bandwidth information described in the second embodiment, and also the rendering processing command 101.

Figure 11:
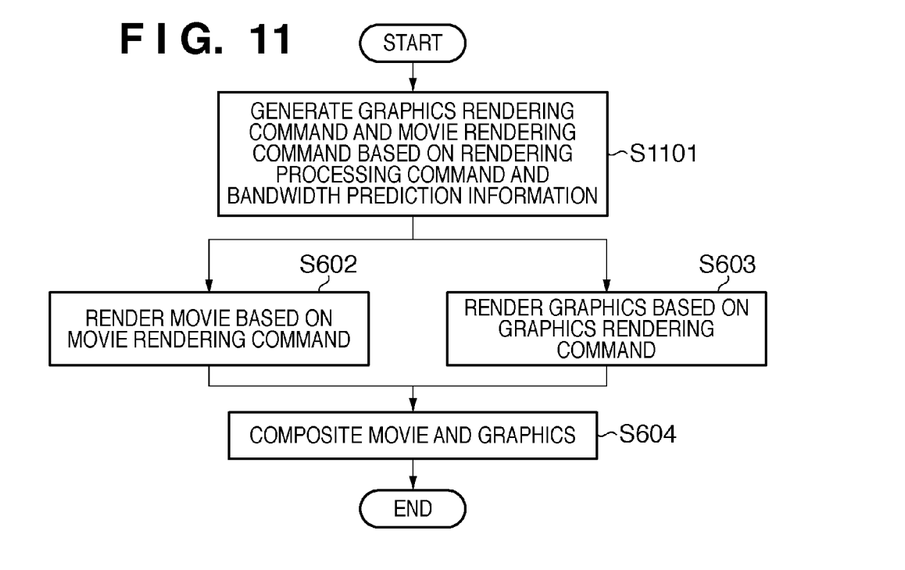
FIG. 11 is a flowchart of processing executed when the display apparatus according to the third embodiment of the present invention composites and displays movie and graphics data.

FIG. 11 is a flowchart of processing executed when the display apparatus according to this embodiment composites and displays movie and graphics data. Note that the same step numbers in FIG. 11 denote the steps that execute the same processes as in FIG. 6, and a repetitive description thereof will be avoided.

In step S1101, the rendering control unit 102 executes the same processing as in the first embodiment using the bandwidth prediction information 1002 and rendering processing command 101 output from the bandwidth prediction unit 1001.

Figure 12:
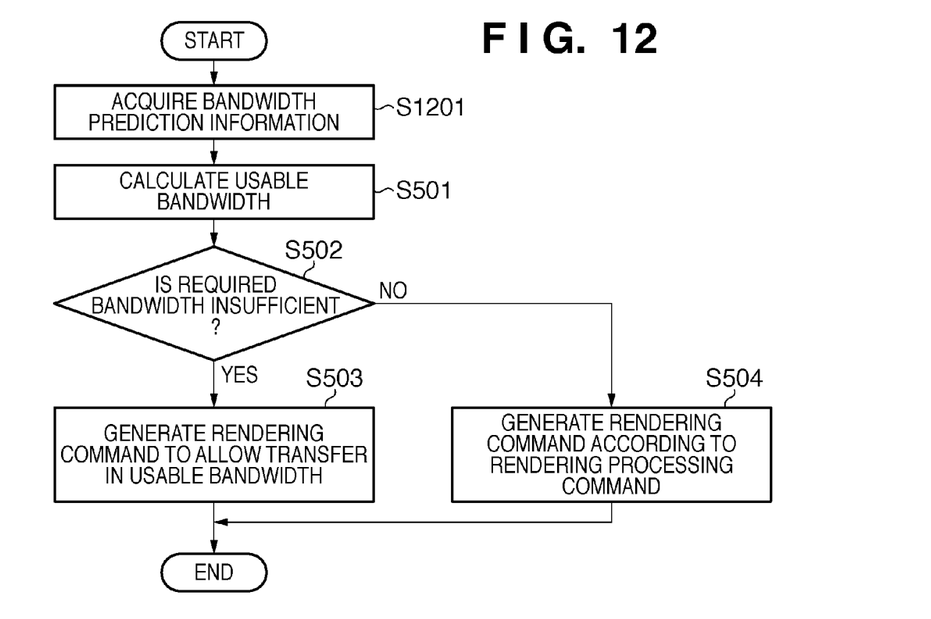
FIG. 12 is a flowchart showing details of processing in step S1101.

FIG. 12 is a flowchart showing details of the processing in step S1101.

In step S1201, the rendering control unit 102 acquires the predicted graphics and movie read/write speeds, which are predicated by the bandwidth prediction unit 1001 based on the current graphics and movie read/write speeds as the bandwidth prediction information 1002. This information indicates the data transfer amount (MB) per sec.

The subsequent processes are executed in the same manner as in the first embodiment. That is, whether or not the read/write speeds acquired in step S1201 are lower than the minimum speeds is determined, and processing for correcting the rendering processing command 101 is executed in accordance with the determination result.

According to the aforementioned embodiments, a composite output of a plurality of movie data and graphics data can be implemented with lower cost. Also, the graphics and movie rendering processes can be adaptively controlled within limited read/write speeds.

[Fourth Embodiment]

In the description of the above embodiments, all of the respective units which configure the display apparatuses shown in FIGS. 1, 7, and 10 are configured by hardware components. However, these units may be implemented as computer programs. In this case, when these computer programs are installed in a general computer and are executed, that computer serves as the display apparatus.

Figure 14:
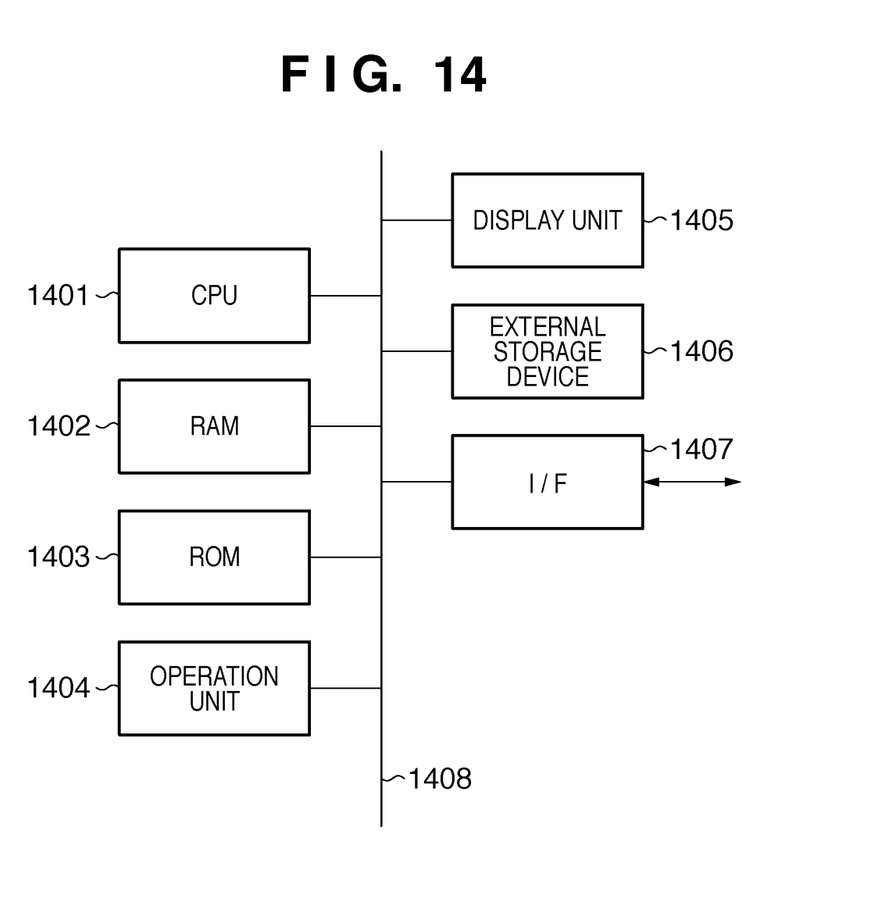
FIG. 14 is a block diagram showing an example of the hardware arrangement of a computer applicable to the display apparatuses according to the respective embodiments.

FIG. 14 is a block diagram showing an example of the hardware arrangement of a computer applicable to the display apparatuses according to the above embodiments.

A CPU 1401 controls the overall computer and executes respective processes described in the above embodiments as those to be implemented by the display apparatuses using computer programs and data stored in a RAM 1402 and ROM 1403.

The RAM 1402 has an area for temporarily storing computer programs and data loaded from an external storage device 1406 and those externally received via an I/F (interface) 1407. Furthermore, the RAM 1402 has a work area used when the CPU 1401 executes various processes. That is, the RAM 1402 can provide various areas as needed.

The ROM 1403 stores setting data, a boot program, and the like of this computer.

An operation unit 1404 can input various instructions to the CPU 1401 when it is operated by an operator of this computer.

A display unit 1405 includes a CRT or liquid crystal display panel, and can display the processing result of the CPU 1401 by means of images, characters, and the like. For example, the display unit 1405 displays a composition result of graphics data on movie data as a result of the processing described in each of the above embodiments.

The external storage device 1406 is a large-capacity information storage device represented by a hard disk drive. The external storage device 1406 saves an OS (Operating System), and computer programs for making the CPU 1901 execute the functions of the respective units shown in FIGS. 1, 7, and 10 as those which configure the display apparatuses. Also, the external storage device 1406 saves the bandwidth control information 112 and information used as needed in the above processing as data. The computer programs and data saved in the external storage device 1406 are loaded onto the RAM 1402 as needed under the control of the CPU 1401, and are processed by the CPU 1401.

The I/F 1407 is used to input computer programs and data to this computer, and to externally output the processing result of this computer.

Reference numeral 1408 denotes a bus which interconnects the aforementioned units.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-195312 filed Jul. 29, 2008, which is hereby incorporated by reference herein in its entirety.

What is claimed is:

1. A display apparatus, which comprises a memory having a memory area used to render a movie and a memory area used to render a graphic to be composited on the movie, and reads out and displays an image written in the memory, comprising:
   a unit which acquires rendering command information which describes rendering commands of the movie and the graphic;
   a determination unit which determines display modes of the movie and graphic with reference to the rendering command information;
   a unit which acquires maximum speed information indicating a maximum value of a read/write speed allowed for the memory;
   a decision unit which decides a first speed to be distributed to a read/write speed of the movie with respect to the memory and a second speed to be distributed to a read/write speed of the graphic with respect to the memory, of a maximum speed indicated by the maximum speed information, based on the determination result of said determination unit; and
   a control unit which controls a read/write access of an image with respect to the memory based on the rendering command information, in accordance with the speeds decided by said decision unit;
   wherein said decision unit decides the first speed and second speed by referring the determined display modes and table information which holds information, used to prescribe a speed to be distributed to the read/write speed of the movie and a speed to be distributed to the read/write speed of the graphic, in correspondence with each of combinations of display modes of the movie and display modes of the graphic, wherein the information held for each of the combinations corresponds to a combination of priority for the movie and priority for the graphic.

2. The apparatus according to claim 1, wherein said decision unit acquires first speed information indicating a read/write speed required to read/write the movie with respect to the memory, and second speed information indicating a read/write speed required to read/write the graphic with respect to the memory,
   wherein said control unit comprises:
   a correction unit, which corrects a rendering command of the movie in the rendering command information when the first speed is lower than the speed indicated by the first speed information, and corrects a rendering command of the graphic in the rendering command information when the second speed is lower than the speed indicated by the second speed information; and
   a unit which controls a read/write access of an image with respect to the memory based on the rendering command information corrected by said correction unit, in accordance with the speeds decided by said decision unit.

3. The apparatus according to claim 2, wherein said decision unit calculates the first speed information and the second speed information based on setting information which prescribes an image to be input/output by said display apparatus.

4. The apparatus according to claim 3, wherein said decision unit calculates, as the first speed information, a total value of a product of the number of bits, an image size, and a frame rate of input movie, and a product of the number of bits, an image size, and a frame rate of output movie.

5. The apparatus according to claim 3, wherein said decision unit calculates, as the second speed information, a product of the number of bits, a graphic size, and a frame rate of the graphic.

6. The apparatus according to claim 2, wherein when the first speed is lower than the speed indicated by the first speed information, said control unit corrects a rendering command which prescribes a size of the movie in the rendering command information.

7. The apparatus according to claim 2, wherein when the first speed is lower than the speed indicated by the first speed information, said control unit corrects a rendering command which prescribes an output resolution of the movie in the rendering command information.

8. The apparatus according to claim 2, wherein when the second speed is lower than the speed indicated by the second speed information, said control unit corrects a rendering command which prescribes a size of the graphic in the rendering command information.

9. A display control method for a display apparatus, which comprises a memory having a memory area used to render a movie and a memory area used to render a graphic to be composited on the movie, and reads out and displays an image written in the memory, using the display apparatus to perform the steps of:
   a step of acquiring rendering command information which describes rendering commands of the movie and the graphic;
   a determination step of determining display modes of the movie and graphic with reference to the rendering command information;
   a step of acquiring maximum speed information indicating a maximum value of a read/write speed allowed for the memory;
   a decision step of deciding a first speed to be distributed to a read/write speed of the movie with respect to the memory and a second speed to be distributed to a read/write speed of the graphic with respect to the memory, of a maximum speed indicated by the maximum speed information, based on the determination result in the determination step; and
   a control step of controlling a read/write access of an image with respect to the memory based on the rendering command information, in accordance with the speeds decided in the decision step,
   wherein in the decision step, the first speed and second speed are decided by referring the determined display modes and table information which holds information, used to prescribe a speed to be distributed to the read/write speed of the movie and a speed to be distributed to the read/write speed of the graphic, in correspondence with each of combinations of display modes of the movie and display modes of the graphic, wherein the information held for each of the combinations corresponds to a combination of priority for the movie and priority for the graphic.

10. A non-transitory computer-readable storage medium storing a computer program for making a computer function as respective units included in a display apparatus according to claim 1.

* * * * *